A. REYNOLDS.
FISH CLEANING MACHINE.
APPLICATION FILED SEPT. 25, 1920.
1,369,302.
Patented Feb. 22, 1921.
3 SHEETS—SHEET 1.
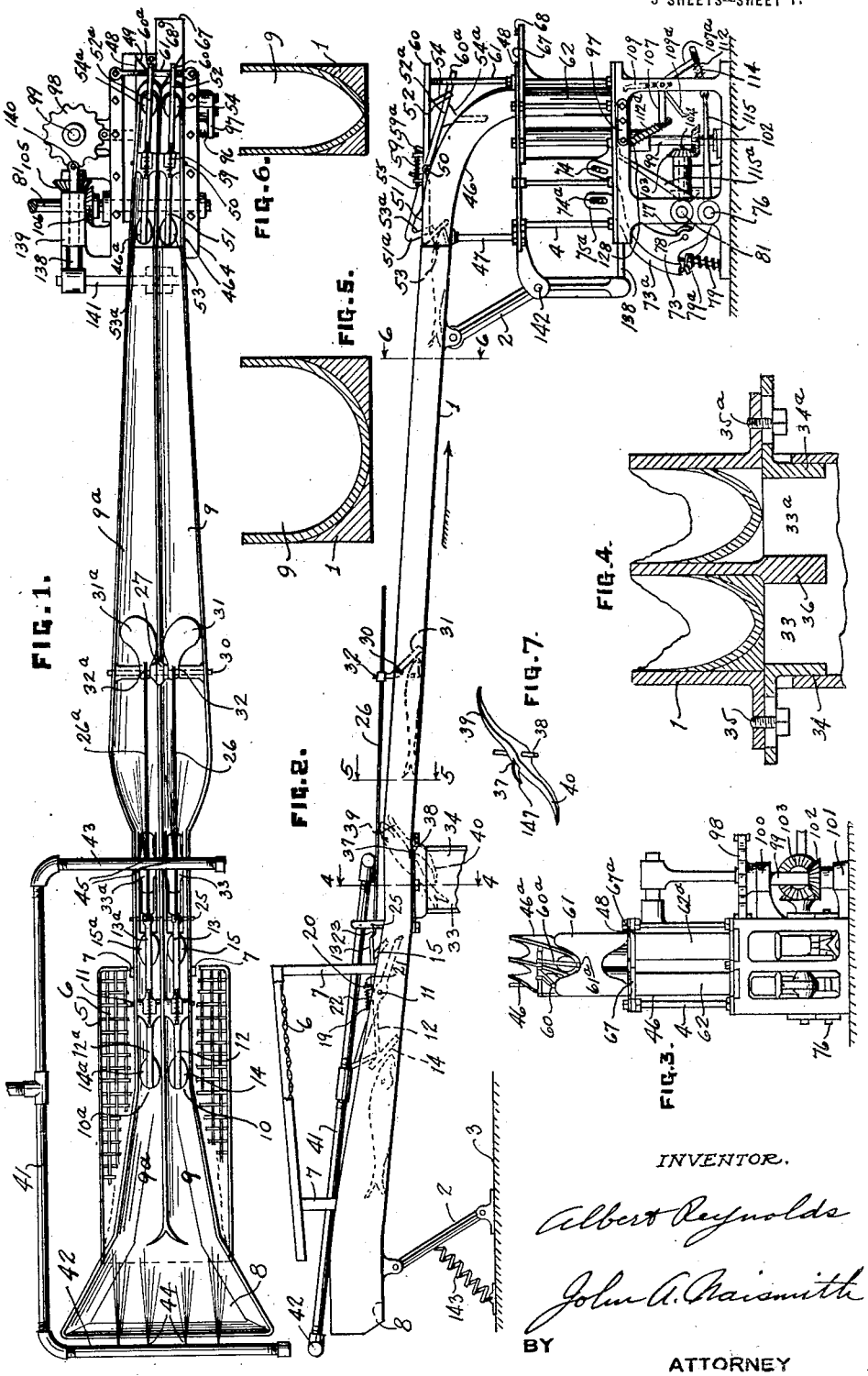
INVENTOR.
Albert Reynolds
BY John A. Naismith
ATTORNEY A. REYNOLDS.
FISH CLEANING MACHINE.
APPLICATION FILED SEPT. 25, 1920.
1,369,302.
Patented Feb. 22, 1921.
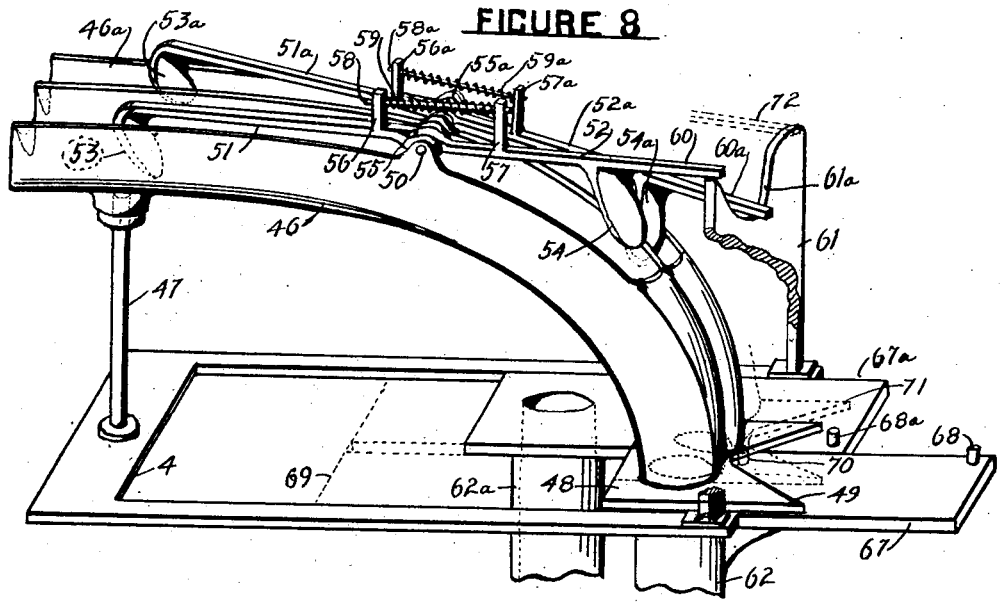
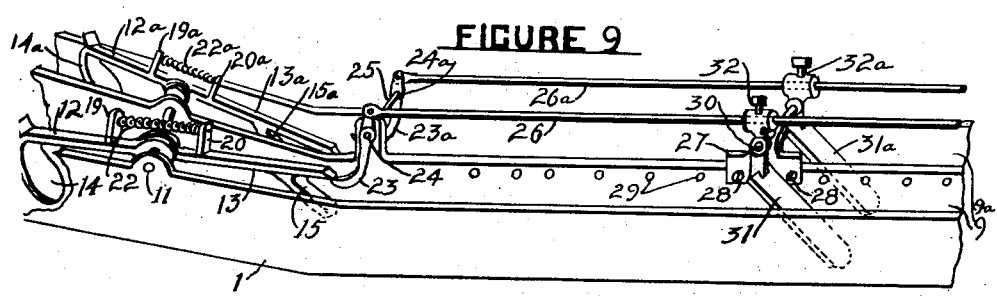
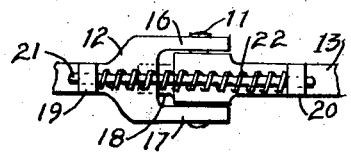
INVENTOR
Albert Reynolds
BY John A. Arrowsmith
ATTORNEY A. REYNOLDS.
FISH CLEANING MACHINE.
APPLICATION FILED SEPT. 25, 1920.
1,369,302.
Patented Feb. 22, 1921.
3 SHEETS—SHEET 3.
FIGURE 10
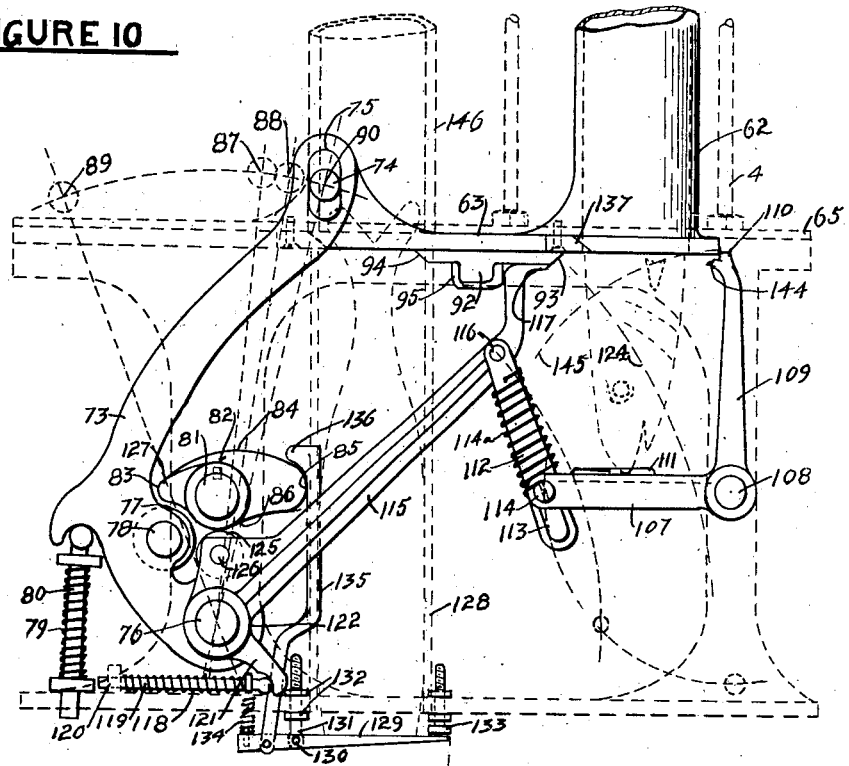
FIGURE 11
FIGURE 12
FIGURE 13
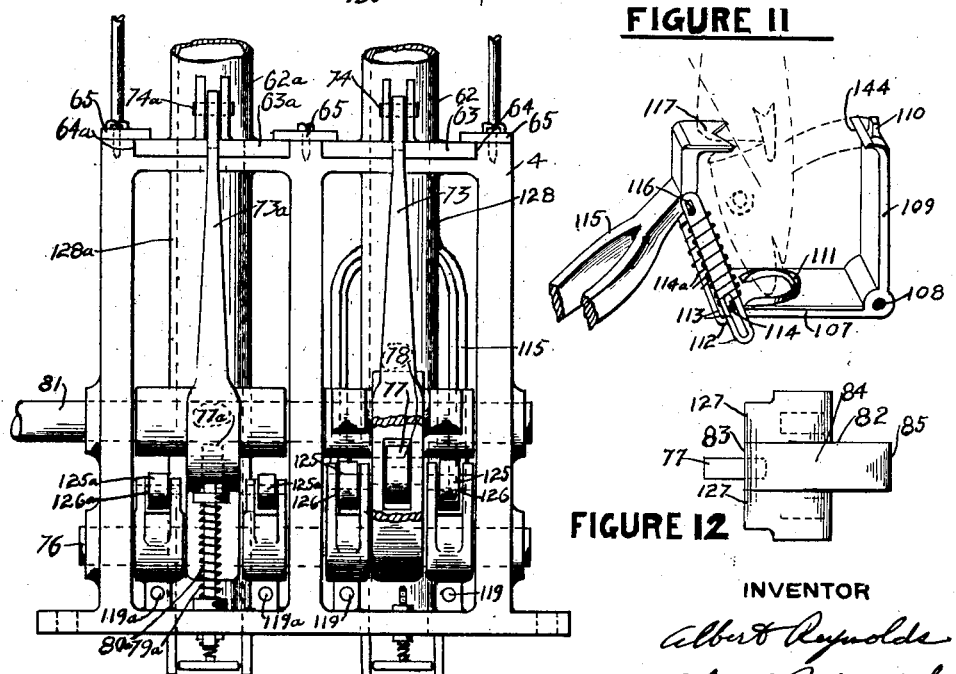
INVENTOR
Albert Reynolds
John A. Naismith
BY
ATTORNEY

UNITED STATES PATENT OFFICE.

ALBERT REYNOLDS, OF SAN JOSE, CALIFORNIA.

FISH-CLEANING MACHINE.

1,369,302.  Specification of Letters Patent.  Patented Feb. 22, 1921.

Application filed September 25, 1920. Serial No. 412,701.

*To all whom it may concern:*

Be it known that I, ALBERT REYNOLDS, a subject of the King of Great Britain, and residing at San Jose, in the county of Santa Clara and State of California, have invented certain new and useful Improvements in Fish-Cleaning Machines, of which the following is a specification.

My invention relates particularly to a machine for beheading and cleaning small fish, and it is the object of my invention to provide a machine of the character indicated that will receive a whole fish and behead and clean the same. I also contemplate providing certain novel devices for handling and operating upon the fish during the cleaning process.

In the drawing:—

Figure 1 is a plan view of the machine. Fig. 2 is a side elevation of the same. Fig. 3 is a right end elevation of the machine. Fig. 4 is an enlarged section on line 4—4 of Fig. 2. Fig. 5 is an enlarged section of one half of the machine on line 5—5 of Fig. 2. Fig. 6 is an enlarged section of one half of the machine on line 6—6 of Fig. 2. Fig. 7 is a perspective illustration of the fish turning element. Fig. 8 is an enlarged perspective view of the mechanism for depositing the fish in tubes preparatory to the cutting operation. Fig. 9 is an enlarged perspective view of the fish spacing mechanism. Fig. 10 is an enlarged side elevation of the fish positioning and cutting mechanism, the frame being shown in dotted lines. Fig. 11 is a perspective view of the mechanism for holding the fish during the cutting operation. Fig. 12 is an enlarged plan view of the cam used for operating the parts shown in Fig. 10. Fig. 13 is a left end elevation of the mechanism shown in Fig. 11 with the frame shown in dotted lines. Fig. 14 is a plan view of the joints in the spacing and feeding elements shown in Figs. 8 and 9. Fig. 15 is a side elevation of the structure shown in Fig. 14. Fig. 16 is a detail illustration of the reciprocating knife mechanism. Fig. 17 is a detail illustration of the mounting of the fish discharging plate.

Referring more particularly to the drawings, at 1 is shown a chute pivotally mounted on arms 2 which are in turn pivotally mounted on a suitable support 3 and a frame 4. thereby permitting a shaking movement to be imparted to chute 1 in a manner hereinafter described.

At 5 is a hopper provided with a screen bottom 6 and rigidly mounted on chute 1 as by supports 7 so as to shake therewith. Fish dumped on to screen bottom 6 are by the shaking movement and the foraminous structure of the bottom 6 caused to spread out and drop slowly into chute 1. The hopper being on an incline the regular shaking of the same causes the scales of the fish to engage the perforated or rough bottom 6 thereby turning them about so that they move downwardly head foremost, at the same time the rough bottom 6 removes by friction the greater portion of the scales thereon.

In the structure shown the upper portion of chute 1 forms a basin 8 to receive fish from hopper 5, this basin discharging into two smaller chutes 9—9ª. Chute 9 converges to a point 10 to form a portion of substantially uniform width in which a spacing mechanism is arranged. This spacing mechanism consists of a shaft 11 mounted on side walls of the chute and having a pair of arms 12—13 mounted to revolve thereon, each arm having a downwardly extending gate as 14 and 15 respectively. Arm 12 is forked to straddle arm 13 on shaft 11 as at 16 and 17, and arm 13 has a lug 18 extending therefrom to engage the under side of arm 12 between forks 16—17. On the upper sides of arms 12—13 are lugs 19—20 respectively having a pin 21 passing therethrough with a spring 22 thereon. At 23 is shown a finger engaging the end of arm 13 and pivoted at 24 on shaft 25 mounted on chute 9. To the upper end of finger 23 is connected a rod 26. At 27 is a supporting guide formed to engage the side of chute 9 and is secured thereon by pins 28 in holes 29. Guide 27 carries a shaft 30 upon which is pivotally mounted a gate 31 extending downwardly into chute 9 and adjustably secured at its upper end to rod 26 as at 32. Fish coming down chute 9 are stopped by gate 14 after one fish has been allowed to pass thereby. When this fish advances into contact with gate 31 and passes thereunder it operates rod 26 to operate finger 23 and release arm 13, whereupon a fish advances under gate 14 and is again stopped by gate 15. But as the fish works under gate 15 it automatically closes gate 14 after it and proceeds down chute 9 to gate 31 where the operation is repeated. If in passing through gates 14—15 a second fish should get a start under gate 14 at the time the first one is going under gate 15 then the arms 12 and 13 break at their juncture on shaft 11 and compress spring 22, the pressure of gate 14 on the fish thereunder thereby being relieved to such an extent that although the fish is held against forward movement it is not injured.

By adjusting gate 31 forwardly or backwardly on rod 26 the spacing of the fish as they pass through the machine may be accurately gaged.

Between gates 15 and 31, and in the bottom of chute 9, is a grader and fish positioner.

Supposing the machine illustrated to be the uppermost of several similar mechanisms and therefore to be used for handling the larger grade of fish in a given run. In this case an opening 33 is formed in the bottom of chute 9 having an outer side wall 34 adjustable as by means of a bolt and slot arrangement as at 35. The outer wall 34 is adjustable relative to the inner wall 36 so that all fish of less than a given size will fall therethrough to the hopper of another machine, but the larger fish will pass along through gate 31 as described.

If, however, a fish should pass through gates 14 and 15 tail foremost, the tail end would of course drop into opening 33. To remove this fish from the opening and direct it head foremost down the chute I provide a centrally pivoted arm 37 on shaft 38 at the forward edge of opening 33. The shaking of the whole device causes the fish to move forward until the heavier upper portion engages the upper blade 39 of arm 37 thereby causing the arm to assume a substantially horizontal position, the lower blade 40 lifting the tail of the fish so that it will move easily forward in chute 9.

It is, of course, clear that fish will move more readily through the chute 9 if water is supplied therein. For this purpose I provide a water pipe 41 having branches 42—43 perforated at 44—45 respectively, to direct jets of water into the chute at its upper end and also at a point just below opening 33 so that the fish will move forward in running water. In fact, with this construction the fish will travel down the chute even though the shaking mechanism is not in operation.

In order that uniform operations may be performed upon all of the fish it is necessary that they be delivered to the cutting mechanism turned in one direction. To accomplish this I form chute 9 as indicated in the cross sections in Figs. 5 and 6 respectively, showing that chute 9 changes in cross section from a wide flat form at the top to a narrow and correspondingly deeper form at the bottom. Since this chute is at all times partially filled with water a fish discharged into it immediately turns over bottom upward and is carried along and delivered at the discharge end thereof in that position.

The fish having been graded as to size and properly spaced and positioned, they are discharged into a curved chute 46 pivotally mounted on a standard 47 on frame 4, and curving downwardly on to a plate 48 having a forwardly directed triangular notch 49 formed therein. This plate 48 is sufficiently wide to receive also the lower end of a second chute 46$^a$ formed integrally with chute 46 and moving therewith about standard 47. Chute 46$^a$ is supplied with fish in exactly the same manner as chute 46, the parts distributing the fish thereto being indicated by a suitable numeral followed by the letter "a." In the following description the two sides of the cutting and cleaning mechanism are likewise distinguished.

In chute 46 is arranged a feeding mechanism similar to the spacing mechanism above described. The shaft is shown at 50, the arms at 51 and 52, the gates at 53 and 54, the breakable joint at 55, the lugs, pin and spring at 56—57, 58 and 59 respectively, the forward arm 52 having a projection 60 thereon. Vertically arranged on the front of frame 4 is a plate 61 having a notch 61$^a$ formed in its upper edge over which extensions 60—60$^a$ operate as described.

At 62 is a tube for receiving and holding the fish during the beheading and cleaning operation, the same being mounted on a plate 63 reciprocating in frame 4 in a guide formed by recess 64 and top plates 65. The upper end of tube 62 carries a plate 67 parallel with and in close proximity to plate 48, the said plate 67 carrying an upwardly projecting pin 68 on its upper surface and close to its forward and inner edges. The tube 62 extends through plates 63 and 67 and is in open communication with chute 46 in its extreme forward position.

The plate 48 with notch 49 is a shifting mechanism. When plate 67 is withdrawn to position 69, pin 68 engages notch 49 and moves to the position 70 thereby swinging the plate 48 and chute 46 to the position shown, the extension 60 traveling up notch 61$^a$ and thereby raising gate 54 to permit a fish to slide onto plate 67 and thence into tube 62 when the same is advanced, at the same time dropping gate 53 to prevent additional fish entering the chute. At the time tube 62 is receiving a fish and beginning to cut the same, tube 62$^a$ is completing the cutting process and is withdrawing plate 67$^a$ so that as soon as a fish has been deposited in tube 62 from chute 46 the pin 68$^a$ engages notch 49 and swings chutes 46$^a$ over to the position indicated in dotted lines at 71. This action causes arm 60$^a$ to move up on notch 61$^a$ to the position 72 and arm 60 to move downward to the bottom of the groove, thereby permitting the discharge of a fish past gate 54ᵃ to plate 67ᵃ ready to drop into tube 62ᵃ when the same is advanced, and permitting the passage of a fish past gate 53 to gate 54 ready to be discharged when the chutes are again swung over by the operation of chute 62, plate 67, and pin 68.

As a means of reciprocating plate 63 and the tube 62 thereon, I provide an arm 73 engaging a pin 74 on said plate by means of a slot 75, the arm 73 being pivoted on frame 4 at 76. The arm is provided with a roller 77 on shaft 78 and is normally held in a forward position by a spring 79 and pin 80 engaging an extension on the rear edge thereof, the spring 79 also engaging the bottom plate of frame 4 and the pin 80 passing therethrough. At 81 is a shaft revolubly mounted in frame 4 and carrying a cam 82 having cam surfaces 83—84—85—86, the successive engagement of which with roller 77 causes the arm to assume the several positions 87—88—89—90 and, of course, moving tube 62 into similar positions as hereinafter described. Shaft 81 is driven from a source of power not shown.

At 92 is shown a knife having edges 93—94, the edge 94 being located near the inner edge of the opening in tube 62 when in its most advanced position. Knife 92 is slidably mounted in guide 95 on frame 4 and is reciprocated by means of a spring 96 inserted between arm 97 on frame 4 and said knife, and a cam wheel 98 on vertical shaft 99 in bearings 100 and 101, the said shaft being revolved by a gear 102 thereon meshing with gear 103 on shaft 104, the latter being provided with a gear 105 meshing with gear 106 on driving shaft 81.

At 107 is a plate pivotally mounted on frame 4 at 108 and having an upwardly extending arm 109 provided with a finger 110, the said plate also having a ridge 111 formed upon its upper side as shown. Links are shown at 112 provided with slots 113 to receive pins 114 on plate 107, and having springs 114ᵃ thereon to engage plate 107 and arm 115 to which links 112 are pivotally attached as at 116. Arm 115 is provided with a prong 117 in substantial alinement with edge 95 on knife 92 and normally held in contact with said knife by means of spring 118 on rod 119. Rod 119 passes through a lug 120 on the base plate of frame 4 and engages on arm 121 extending angularly from arm 115 at its pivotal point 122, the said arm 115 being pivotally mounted on shaft 76 in frame 4.

The prong 117 is caused to travel through the arc 124 by means of a roller 125 mounted on arm 115 at 126, the said roller engaging cam surface 127 formed on the sides of cam 82, the arm 115 being forked as shown so as to engage both sides of cam 82 and thereby more equally distribute the pressures thereon.

At 128 is shown a tube of the same cross sectional area and shape as tube 62, formed integrally with frame 4 and so positioned as to be in alinement with tube 62 when said tube is withdrawn by arm 73 to the position 89. At the lower end of the tube 128 is positioned a plate 129 pivoted at 130 to a threaded pin 131 adjustably mounted in the base plate of frame 4 by means of nuts 132. Plate 129 is normally held in a horizontal position against adjustable stop 133 set in the base plate of frame 4 by a spring 134 inserted as shown. Pivotally attached to plate 129 is an arm 135 extending upwardly to engage cam 82 by a hook 136 as shown. Arm 135 is provided with flanges 136ᵃ to engage tube 128, and tube 128 is provided with a slot 136ᵇ in which arm 135 slides vertically when operated by cam 82.

Set in the rear lower edge of tube 62 is knife 137 operating in the manner hereinafter described.

A shaking movement is conveyed to chute 1 by means of a rod 138 slidably mounted in the bearing 139 in frame 4 and engaging cam wheel 98 at one end through the medium of roller 140, and secured to an arm 141 at its other end. Arm 141 is secured to the lower end of arm 2 which is pivotally mounted on frame 4 at 142. The mechanism described moves the parts in the direction indicated by the arrow, and gravity assisted by a tension spring 143 actuates the movable parts in the opposite direction.

A fish having been deposited head foremost in tube 62 with its back toward the knife edge 93, it drops through said tube until its nose rests upon plate 107 where it is prevented from slipping sidewise by ridge 111. Since at this moment finger 110 is in engagement with plate 63 the impact of the fish does not move plate 107.

The surfaces 83—84—85 of cam 82 engage roller 77 in the order named, the surface 86 merely passing over the roller so that arm 73 is in the position shown to receive a fish. As surface 83 engages the roller, arm 73 is moved to position 87, the knife edge 93 cutting the fish through the back bone and solid flesh parts to the abdominal cavity. The instant plate 63 is moved, however, and before the fish contacts with knife edge 93, the finger 110 is released thereby allowing the fish to depress plate 107 a distance against the tension of spring 112, the weight of the fish itself thereby determining the point at which it is cut.

The fish having been cut as described, cam surface 84 allows arm 73 to move back to position 88 at the same time that cam surfaces 127 on the sides of cam 82 engage the roller 125 on arm 115. This operation forces prong 117 through arc 124 and, through the medium of links 112 and plate 130

107, forces edge 144 on arm 109 through arc 145 so that the head of the fish is caught between prong 117 and edge 144 and torn from the body and carried downwardly and discharged over the edge of the plate 107 carrying the entrails of the fish with it. The parts are proportioned so that prong 117 passes under edge 144 and arm 109 as shown in Fig. 2, the arm 109 and edge 144 serving to hold the head of the fish in engagement with prong 117. Cam surface 85 now engages roller 77 and throws arm 73 into the position 89, this action moving tube 62 into the position shown in dotted lines at 146, trimming the torn edge of the fish on knife edge 93 and allowing it to drop into tube 128 to rest on plate 129. The further movement of cam 82 carries the tube 62 back to its original position. If the fish is projecting out of tube 128 the return movement of tube 62 cuts this projecting portion off between edges 137 and 94. The maximum length of the trimmed fish may be determined by adjusting the height of plate 129 by nuts 132 on pin 131. The engagement of cam surface 85 with hook 136 on arm 135 swings plate 129 downwardly to permit the discharge of the fish from the machine.

In a machine constructed as described the fish are dumped into hopper 5 and spread out and partially scaled, then passed at predetermined intervals into chutes 9—9$^a$, graded as to size at 33—33$^a$, turned head foremost if required at 37—37$^a$, turned bottom upward in chutes 9—9$^a$ below turner elements 37—37$^a$, and fed alternately at predetermined periods into tubes 62—62$^a$. The length of head portion to be removed is now automatically gaged by springs 114, the back bone and solid flesh parts cut by knife edge 93 through the operation of arm 73 to position 87, the fish removed a distance from the knife edge by the operation of arm 73 to position 88, the head and entrails removed by coöperating arms 115 and 109, the fish carried back to and dropped into tube 128 through the operation of arm 73 to position 89, the length of the fish gaged by adjustable plate 129, any excess in length of the fish removed by knife edges 137 and 94 through the operation of arm 73 to position 90, and the fish finally discharged through the operation of arm 135 with cam 82.

On the central portion of the upper surface of the fish turning element 37 is a backwardly directed prong 147. A fish passing down chute 9 tail foremost will be assisted in turning by this prong since it will engage the tail of the fish and guide it downwardly, whereupon the element operates as hereinbefore described.

It is to be understood, of course, that the mechanism herein shown and described is illustrative only, and that changes in form, proportions, construction, method of operation, and in the combinations of the several mechanisms, may be made within the scope of the appended claims.

I claim:

1. A fish cleaning machine including a chute adapted to receive fish, means for propelling fish along said chute, means for directing the fish head foremost down said chute, means for turning the fish bottom upward in said chute, a cutting and cleaning mechanism, and means for depositing said fish in said cutting and cleaning mechanism at predetermined intervals.

2. A fish cleaning machine including a chute adapted to receive fish, means for propelling fish along said chute, means for directing the fish head foremost down said chute, means for turning the fish bottom upward in said chute, a fish feeding mechanism to receive fish from said chute, a cutting and cleaning mechanism, and means for operating said feeding mechanism at predetermined intervals to deposit fish in said cutting and cleaning mechanism.

3. A fish cleaning machine including a chute adapted to receive fish, means for propelling fish along said chute, means for directing the fish head foremost down said chute, a water bath in said chute for turning the fish bottom upward, a cutting and cleaning mechanism, and means for depositing said fish head foremost in said cutting and cleaning mechanism at predetermined intervals.

4. A fish cleaning machine including a chute having a wide portion and a relatively deep and narrow portion and having flowing water therein, means for depositing fish in said wide portion at predetermined intervals head foremost, a cutting and cleaning mechanism, and means for receiving fish from the narrow portion of said chute and depositing them head foremost in said cutting and cleaning mechanism at predetermined intervals.

5. A fish cleaning machine including a chute having flowing water therein for moving the fish forward and turning the same bottom upward, a cutting and cleaning mechanism, and means for receiving the fish from said chute and depositing the same head foremost in said cutting and cleaning mechanism at predetermined intervals.

6. A fish cleaning machine including a chute having flowing water therein for moving the fish forward and turning the same bottom upward, a grading device operatively inserted in said chute, a cutting and cleaning mechanism, and means for receiving the graded fish from said chute and depositing the same head foremost in said cutting and cleaning mechanism at predetermined intervals.

7. A fish cleaning machine including a chute having flowing water therein for moving the fish forward and turning the same bottom upward, a grading device operatively inserted in said chute, a device for turning fish head foremost operatively mounted in said chute and grading device, a cutting and cleaning mechanism, and means for receiving the graded fish from said chute and depositing the same head foremost in said cutting mechanism at predetermined intervals.

8. A fish cleaning machine including a chute having flowing water therein for moving the fish forward and turning the same bottom upward, a fish spacing device operatively mounted in said chute, a cutting and cleaning mechanism, and means for receiving the graded fish from said chute and depositing the same head foremost in said cutting and cleaning mechanism at predetermined intervals.

9. A fish cleaning machine including a chute having flowing water therein for moving the fish forward and turning the same bottom upward, a fish spacing device operatively mounted in said chute, a grading device operatively inserted in said chute below said spacing device, a cutting and cleaning mechanism, and means for receiving the fish from said chute and depositing the same head foremost in said cutting and cleaning mechanism at predetermined intervals.

10. A fish cleaning machine including a chute having flowing water therein for moving the fish forward and turning the same bottom upward, a fish spacing device operatively mounted in said chute, fish operated tripping mechanism operatively mounted to control said spacing device, a cutting and cleaning mechanism, and means for receiving the fish from said chute and depositing the same head foremost in said cutting and cleaning mechanism at predetermined intervals.

11. A fish cleaning machine including a chute having flowing water therein for moving the fish forward and turning the same bottom upward, means for imparting a shaking movement to said chute, a cutting and cleaning mechanism, and means for receiving the fish from said chute and depositing the same head foremost in said cutting and cleaning mechanism at predetermined intervals.

12. A fish cleaning machine including a chute adapted to receive fish, an inclined hopper mounted thereon to deliver fish thereto and having a roughened bottom, means for imparting a shaking movement to said chute and hopper to move the fish thereover, fish spacing devices operatively mounted in said chute, a cutting and cleaning mechanism, and means for depositing said fish in said cutting and cleaning mechanism at predetermined intervals.

13. A fish cleaning machine including a chute adapted to receive fish, a fish scaling hopper operatively mounted to discharge fish into said chute, means for propelling fish along said chute, means for directing the fish headforemost down said chute, means for turning the fish bottom upward in said chute, a cutting and cleaning mechanism, and means for depositing said fish in said cutting and cleaning mechanism at predetermined intervals.

14. In a fish cleaning machine, a chute operatively mounted for the discharge of fish therethrough, a fish spacing mechanism comprising arms pivotally mounted thereon in longitudinal relation thereto, a gate depending from each arm, and fish operated tripping mechanism for normally holding one of said gates in the path of the fish in said chute.

15. In a fish cleaning machine, a chute operatively mounted for the discharge of fish therethrough, a fish spacing mechanism comprising arms pivotally mounted thereon in longitudinal relation thereto, and resiliently mounted with relation to each other, a gate depending from each arm, and fish operated tripping mechanism for normally holding one of said gates in the path of the fish in said chute.

16. In a fish cleaning machine, a chute operatively mounted for the passage of fish therethrough, a fish spacing mechanism comprising arms pivotally mounted thereon in longitudinal relation thereto, an upstanding lug on each arm, a resilient connection between said lugs, a finger on one arm projecting under and engaging the under side of the other arm, a gate depending from each arm, and fish operated tripping mechanism for normally holding one of said gates in the path of the fish in said chute.

17. In a fish cleaning machine, a chute operatively mounted for the passage of fish therethrough, a fish spacing mechanism comprising arms pivotally mounted thereon in longitudinal relation thereto, a gate depending from each arm, a tripping finger pivotally mounted on said chute to engage the end of one of said arms, a rod pivotally connected to said tripping finger, and fish engaging gate mounted on said rod and extending downwardly into said chute.

18. In a fish cleaning machine, a chute operatively mounted for the passage of fish therethrough, a fish spacing mechanism comprising arms pivotally mounted thereon in longitudinal relation thereto, a gate depending from each arm, a tripping finger pivotally mounted on said chute to engage the end of one of said arms, a rod pivotally connected to said tripping finger, and a fish engaging gate adjustably mounted on said rod and extending downwardly into said chute.

19. In a fish cleaning machine, a chute operatively mounted for the passage of fish therethrough and having an opening formed in the bottom thereof, and a fish turning element pivotally mounted in said opening, said element comprising an arm extending upwardly into said chute, an arm extending downwardly into said opening, and a prong formed on its upper side at its pivotal point.

20. A fish cleaning machine including a chute, means associated with said chute for carrying the fish forward therein and discharging the same therefrom head foremost and bottom upward, a downwardly curving chute to receive said fish, cutting and cleaning mechanism operatively mounted to receive the fish from said downwardly curving chute, and means operatively mounted in said downwardly curving chute for feeding said fish to the cutting and cleaning mechanism at predetermined intervals.

21. A fish cleaning machine including a chute, means associated with said chute for carrying the fish forward therein and discharging the same therefrom head foremost and bottom upward, a downwardly curving chute to receive said fish, cutting and cleaning mechanism operatively mounted to receive the fish from said downwardly curving chute, means operatively mounted in said downwardly curving chute for feeding said fish to the cutting and cleaning mechanism at predetermined intervals, and means operated by said cleaning and cutting mechanism for actuating said feeding means.

22. A fish cleaning machine including a pair of adjustable downwardly curving positioning chutes, means for delivering fish thereto head foremost and bottom upward, a feeding mechanism in each chute, a pair of alternately operating cutting and cleaning mechanisms, and means operated by said cutting and cleaning mechanism for adjusting said chutes and actuating said feeding mechanisms to deposit a fish first in one cutting and cleaning mechanism and then in the other.

23. A fish cleaning machine including a pair of adjustable downwardly curving positioning chutes, means for delivering fish thereto head foremost and bottom upward, a feeding mechanism in each chute, a pair of alternately reciprocating holders, cutting and cleaning mechanism operatively mounted with relation thereto, and means operated by said holders for alternately throwing one of said chutes into communication with one of said holders and then throwing the other chute into communication with the other holder.

24. A fish cleaning machine including a pair of adjustable downwardly curving positioning chutes, means for delivering fish thereto head foremost and bottom upward, a feeding mechanism in each chute, a pair of alternately reciprocating holders, cutting and cleaning mechanism operatively mounted with relation thereto, and means operated by said holders for alternately throwing one of said chutes into communication with one of said holders and actuating said feeding mechanism to deposit a fish therein, and then throwing the other chute into communication with the other holder and actuating the feeding mechanism in said chute to deposit a fish in said holder.

25. A fish cleaning machine including a pair of downwardly curving positioning chutes adjustably mounted upon a vertical axis, means for delivering fish thereto head foremost and bottom upward, a bottom plate common to both chutes, a feeding mechanism operatively mounted in each chute and having a forwardly extending arm, a cam fixedly arranged with relation to said arms, a pair of alternately reciprocating holders operatively mounted below said chutes, cutting and cleaning mechanism operatively mounted with relation thereto, and means carried by said holders for engaging the bottom plate of said chutes and swing said chutes into communication with first one holder and then the other and thereby operating said arms on said cam to actuate the feeding mechanism.

26. A fish cleaning machine including a pair of downwardly curving positioning chutes adjustably mounted upon a vertical axis, means for delivering fish thereto head foremost and bottom upward, a bottom plate common to both chutes, and having a notch formed in its forward end, a feeding mechanism operatively mounted in each chute and having a forwardly extending arm, a cam fixedly arranged with relation to said arms, a pair of alternately reciprocating holders operatively mounted below said chutes, cutting and cleaning mechanisms operatively mounted with relation thereto, a plate carried by each holder, a pin on the forward and upper surface of each plate adapted to engage the notch in said bottom plate for said chutes whereby to swing said chutes into alternate communication with their respective holders and operate said arms on said cam to actuate said feeding devices.

27. A fish cleaning machine including a reciprocating fish holder means for depositing a fish therein head foremost and back directed rearwardly, means for supporting the fish in said holder, a knife edge positioned at the lower end of said holder adjacent the back of the fish placed therein, means for moving said holder a distance whereby to cause said knife edge to cut through said fish a distance, means for disengaging the cut fish from said knife edge, and means for removing the severed portion of the fish from the portion in said holder.

28. A fish cleaning machine including a reciprocating fish holder means for depositing a fish therein head foremost and back directed rearwardly, means for supporting the fish in said holder, a knife edge positioned at the lower end of said holder adjacent the back of the fish placed therein, means for moving said holder a distance whereby to cause said knife edge to cut through said fish a distance, means for disengaging the cut fish from said knife edge, and means for removing the severed portion of the fish from the portion in said holder, a discharge tube, and means for moving said holder into alinement with said tube to discharge the fish therefrom.

29. A fish cleaning machine including a reciprocating fish holder means for depositing a fish therein head foremost and back directed rearwardly, means for supporting the fish in said holder, a knife edge positioned at the lower end of the holder adjacent the back of the fish placed therein, means for moving said holder a distance whereby to cause said knife edge to cut through said fish a distance, means for disengaging the cut fish from said knife edge, means for removing the severed portion of the fish from the portion in said holder, a discharge tube, means for moving said holder into alinement with said tube to discharge the fish therefrom, and means for moving said holder back to a position adjacent said knife edge.

30. A fish cutting and cleaning mechanism comprising a reciprocating fish holder, means for moving said holder from a normal advanced position a distance rearwardly, then a distance forwardly, then an extreme distance rearwardly and then again forwardly to said normal position, means for supporting a fish in said holder, a knife edge arranged in the path of travel of a fish in said holder when moved a distance rearwardly from a normal position, means acting subsequently to said knife edge for removing the severed portion of the fish from the body portion.

31. A fish cutting and cleaning mechanism comprising a reciprocating fish holder, means for moving said holder from a normal advanced position a distance rearwardly, then a distance forwardly, then an extreme distance rearwardly and then again forwardly to said normal position, means for supporting a fish in said holder, a knife edge arranged in the path of travel of a fish in said holder when moved a distance rearwardy from a normal position, means acting subsequently to said knife edge for removing the severed portion of the fish from the body portion, and means for receiving the cut fish from said holder when moved to an extreme rearward position.

32. A fish cleaning machine including a reciprocating fish holder a knife edge operatively mounted adjacent said holder to partially cut the fish carried thereby, means for removing the cut portion from the portion of the fish in the holder, and means for operating said removing means subsequent to said cutting operation.

33. A fish cleaning machine including a reciprocating fish holder a knife edge operatively mounted to reciprocate adjacent said holder to partially cut the fish carried thereby, means for removing the cut portion from the portion of the fish in the holder, and means for operating said removing means subsequent to said cutting operation.

34. A fish cleaning machine including a reciprocating fish holder means arranged below said holder to gage the amount to be removed from a fish placed therein, a knife edge operatively mounted adjacent said holder to partially cut the fish carried thereby, means for removing the cut portion from the portion of the fish in the holder, and means for operating said removing means subsequent to said cutting operation.

35. A fish cleaning machine including a reciprocating fish holder, means for supporting a fish in said holder, means operatively mounted to cut through the back of a fish in said holder, and means for tearing the cut portion of the fish from the portion in said holder.

36. A fish cleaning machine including a reciprocating fish holder means for supporting a fish in said holder, means operatively mounted to cut through the back of a fish in said holder, and means for tearing the cut portion of the fish from the portion in said holder, a receiving tube, means for depositing the cut fish in said receiving tube, a knife edge arranged at the upper end of said receiving tube, and an opposing knife edge arranged on said holder whereby the excess of fish may be removed by the return movement of said holder.

37. A fish cleaning machine including a reciprocating fish holder means for supporting a fish in said holder, means operatively mounted to cut through the back of a fish in said holder, means for tearing the cut portion of the fish from the portion in said holder, a receiving tube, and means for depositing the cut fish in said receiving tube.

38. A fish cleaning machine including a reciprocating fish holder means for supporting a fish in said holder, means operatively mounted to cut through the back of a fish in said holder, means for tearing the cut portion of the fish from the portion in said holder, a receiving tube, an adjustable bottom pivotally mounted thereon, means for depositing the cut fish in said receiving tube, and means for operating said pivotally mounted bottom for discharging the cut fish from said receiving tube.

39. A fish cleaning machine including a fish holder, means for supporting a fish therein, means operatively mounted to cut through the back of a fish in said holder, an arm pivotally mounted to engage the cut portion of the fish at the back thereof and remove the same from the portion in the holder, a shorter arm pivotally mounted to engage the cut portion of the fish to hold the same in contact with said first arm, and means for operating said cutting means and said arms in coördinate relation with each other.

40. A fish cleaning machine including a fish holder, resiliently mounted means for supporting a fish therein, means operatively mounted to cut through the back of a fish in said holder, an arm pivotally mounted to engage the cut portion of the fish at the back thereof and remove the same from the portion in the holder, a shorter arm pivotally mounted to engage the cut portion of the fish to hold the same in contact with said first arm, and means for operating said cutting means and said arms in coördinate relation with each other.

41. A fish cleaning machine including a fish holder, resiliently and pivotally mounted means for supporting a fish therein, means operatively mounted to cut through the back of a fish in said holder, an arm pivotally mounted to engage the cut portion of the fish at the back thereof and remove the same from the portion in the holder, a shorter arm carried by said resiliently and pivotally mounted means to engage the cut portion of the fish to hold the same in contact with said first mentioned arm, and means for operating said cutting means and said arms in coördinate relation with each other.

42. A fish cleaning machine including a reciprocating fish holder, resiliently and pivotally mounted means for supporting a fish therein, an arm carried by said means and engaging said fish holder for preventing the movement of said resiliently mounted means under the impact of a fish thereon and released by the movement of said holder to permit movement of said resiliently mounted means, fish engaging means carried by said arm, means operatively mounted to cut through the back of a fish in said holder, a second arm pivotally mounted to engage the cut portion of the fish at the back thereof and tear the same from the portion in the holder, and means for operating the several operating elements in coördinate relation with each other.

43. A fish cleaning machine including a fish holder, means for supporting a fish therein, means operatively mounted to cut through the back of a fish in said holder, an arm pivotally mounted to engage the cut portion of the fish and remove the same from the portion of the fish in the holder, and means operated by said arm for holding the cut portion of the fish in contact with said arm during said removal.

ALBERT REYNOLDS.